March 31, 1953     J. B. GUNN     2,633,153
AUTOMATIC TRANSFER VALVE FOR PUMPS
Filed April 3, 1951
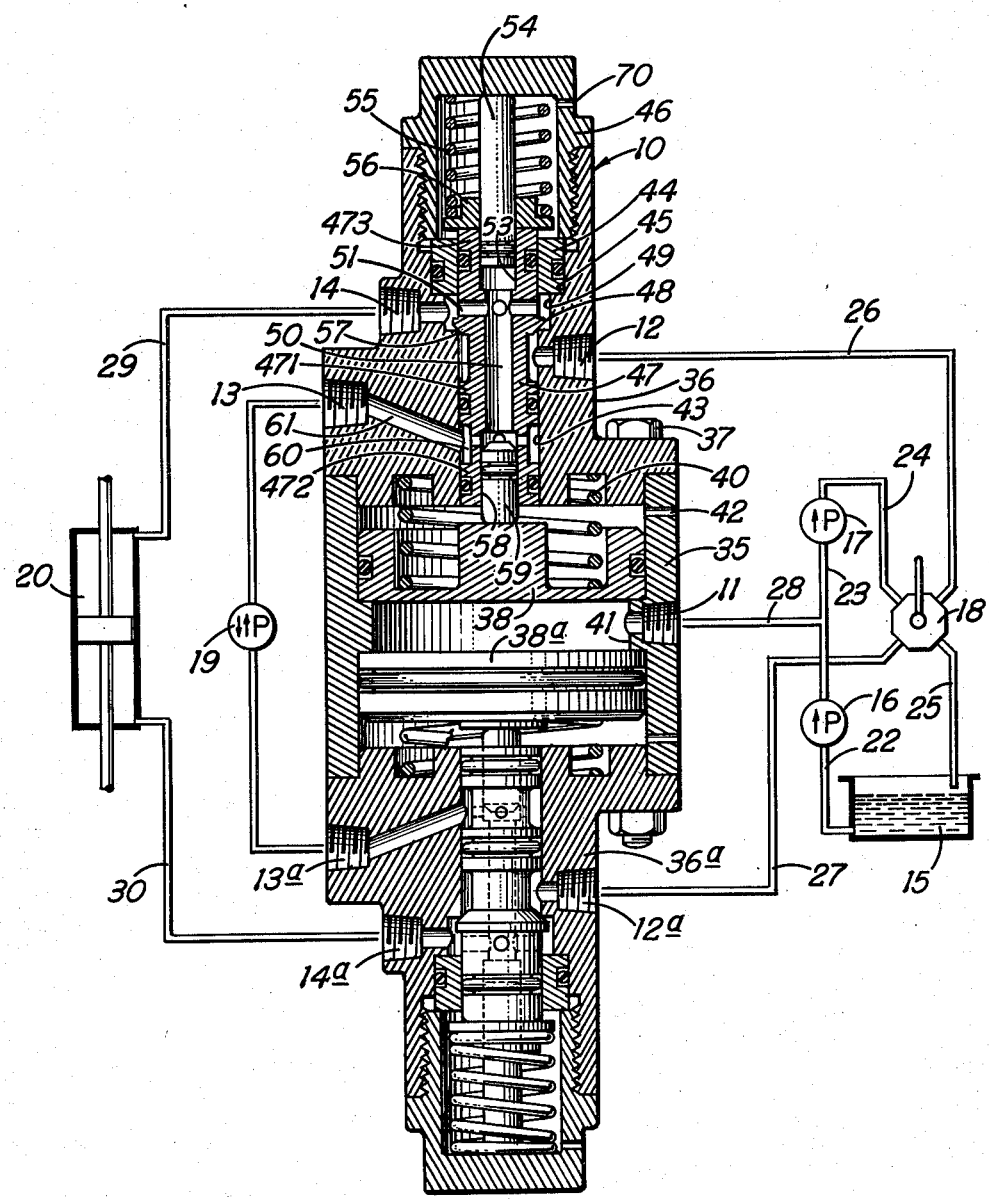
INVENTOR
Joseph B. Gunn
BY
ATTORNEY Patented Mar. 31, 1953

2,633,153

UNITED STATES PATENT OFFICE 2,633,153

AUTOMATIC TRANSFER VALVE FOR PUMPS

Joseph B. Gunn, North Hollywood, Calif., assignor to Bendix Aviation Corporation, South Bend, Ind., a corporation of Delaware Application April 3, 1951, Serial No. 219,054

3 Claims. (Cl. 137—627)

This invention relates to hydraulic systems in which a load normally receives actuating fluid from a primary pressure source such as a power driven pump or accumulator but must get fluid from an auxiliary source such as a hand-pump in the event of failure of the primary source.

A general object of the invention is to provide a pressure-actuated transfer valve for connecting a load to a primary pressure source while the latter is functioning, and disconnecting the load from the primary source and connecting it to an auxiliary source in response to failure of the primary source to deliver fluid at sufficient pressure.

A more specific object is to provide a pressure-actuated transfer valve that is responsive to a relatively low control pressure as compared to the pressures in the transfer lines.

Another object is to provide a transfer valve having relatively low leakage.

Other more specific objects and features of the invention will appear from the description to follow of a particular embodiment of the invention.

The single figure of the drawing shows in longitudinal section a transfer valve in accordance with the invention, in a schematic diagram of a hydraulic system in which the valve may be employed. Referring to the drawing, a valve 10 in accordance with the invention has a control port 11, a primary inlet port 12, a secondary inlet port 13, and an outlet port 14. The ports 12, 13 and 14 are duplicated at the opposite end of the valve and are identified by the reference numerals 12a, 13a and 14a respectively.

As illustrated, the valve is employed in a hydraulic system including a reservoir 15, a booster pump 16, a main pump 17, a 4-way valve 18, an auxiliary hand pump 19, and a hydraulic motor 20. The purpose of the valve 10 is to connect the motor cylinder 20 through the 4-way valve 18 to the main pump 17 when the latter is functioning, and to connect the motor 20 to the hand pump 19 when the pressure fluid supply associated with the 4-way valve 18 fails to function.

The booster pump 16 draws fluid through a duct 22 from the reservoir 15 and delivers it through a duct 23 to the main pump 17, which in turn delivers it through a duct 24 to the 4-way valve 18. The 4-way valve 18 is of standard design having a neutral position in which the duct 24 is blocked (if the valve 18 is of the closed center type) or is connected through a return duct 25 to the reservoir 15 (if the valve 18 is of the open center type). The valve 18 has two operated positions, in one of which it connects the pump duct 24 to a duct 26 leading to the primary inlet port 12, and connects a duct 27 leading to the primary inlet port 12a to the return duct 25. In the other operated position of valve 18, it connects the pump duct 24 to the duct 27 and connects the duct 26 to the return duct 25.

In the illustrated embodiment, the pressure of fluid in the duct 23 between the booster 16 and the main pump 17 is used to control the valve 10, and for this purpose the duct 23 is connected by a duct 28 to the control pressure port 11. As will appear from the description of the valve 10 to follow, when the booster pump 16 is functioning and pressure is applied from the duct 23 through the duct 28, to the control pressure port 11, the primary inlet port 12 is connected to the outlet port 14, which in turn is connected by a duct 29 to one end of the motor 20, and the port 12a is connected to the output port 14a, which is connected by a duct 30 to the other end of the motor 20. Hence the motor 20 is responsive to the main pressure fluid supply under the control of the valve 18.

Should the booster pump 16 become inoperative for any reason, control pressure will no longer be applied to the port 11 of the valve 10 and the latter will thereupon operate to disconnect the ports 12 and 12a from the ports 14 and 14a respectively and will connect the ports 13 and 13a to the ports 14 and 14a respectively, thereby connecting the hand pump 19 to the motor 20. The hand pump 19 may be of the reversible type as shown, so that fluid can be applied to either end of the motor 20 and withdrawn from the other end depending upon the direction of rotation of the pump 19.

Referring now to valve 10, it comprises a casing consisting of a motor cylinder 35 having end closure members 36 and 36a, which may be secured to the cylinder 35 as by bolts 37. The motor cylinder 35 contains a pair of motor pistons 38 and 38a in opposite ends thereof. Since the opposite ends of the valve 10 are identical in structure, only the elements in the upper half of the valve will be further described.

The motor piston 38 is urged downwardly by a helical compression spring 40 compressed between the piston and the end closure member 36 and is limited in its downward movement by a central annular ridge 41 in the motor cylinder. The upper end of the motor cylinder is vented to atmosphere by a vent 42. The end closure member 36 defines a valve cylinder 43 coaxial with the motor cylinder 35 and extending therefrom. An upper end portion of the cylinder 43 is separately formed as an insert 44 to permit assembly of the apparatus. This insert 44 is fitted into a counterbore 45 at the upper end of the closure member 36 and is held in place by a closure plug 46.

There is slidably mounted in the valve cylinder 43 a shuttle valve 47 having a poppet 48 integral therewith and positioned in an annular recess 49 in the valve cylinder 43 immediately below the insert 44. The shuttle valve 47 has two spaced lands 471 and 472 positioned below the poppet 48 and sealing with the cylinder 43, and a third land 473 sealing with that portion of the bore of the valve cylinder defined by the insert 44. The shuttle valve 47 has a central bore 50 extending therethrough, which bore is communicated by lateral bores 51, above the poppet 48, with the annular recess 49, which recess is connected to the output port 14. The upper end of the shuttle valve 47 has a counterbore 53 containing a stationary piston 54 which is restrained against upward movement by contact with the end of the closure plug 46. A helical compression spring 55 compressed between a spring retainer 56, resting on the upper end of the shuttle valve 47, and the upper end of the closure plug 46 urges the shuttle valve into lower position in which the poppet 48 is seated against a seat 57 defined by the junction between the recess 49 and the portion of the valve cylinder 43 therebelow.

At its lower end, the shuttle valve 47 is provided with a counterbore 58 containing a piston 59, the inner end of which normally rests against the motor piston 38. This piston 59 has a tapered upper face constituting a poppet adapted to seat against the lower end of bore 50. The upper end of the counterbore 58 is communicated with an annular recess 60 which is defined by the two lands 471 and 472 and which is communicated by a passage 61 with the secondary inlet port 13.

The valve 10 is shown in the position it assumes when there is no pressure in the control port 11, and the piston 38 has been moved into its inner position by the spring 40, and the shuttle valve 47 has been moved into its inner position by the spring 55. Under this condition, it will be observed that flow inwardly through the inlet port 12 is blocked by the land 471 on the shuttle valve and the poppet 48 thereon, which is seated against the seat 57. However, the secondary inlet port 13 is connected to the outlet port 14 through the passage 61, the annular recess 60, the counterbore 58, the bore 50 (past the open poppet on piston 59), the passages 51 and the recess 49. This is the position assumed in response to failure of pressure from the booster pump 16, which failure results in the connection of the auxiliary pump 19 in operative relation to the motor cylinder 20. The lower portion of the valve 10 functions in the same way to disconnect the outlet port 14a from the primary inlet port 12a and connect it to the other secondary inlet port 13a.

When pressure is supplied to the control port 11, the motor piston 38 is moved upwardly against the force of the spring 40, carrying the piston 59 up until the poppet thereon closes against the lower end of the bore 50 in the shuttle valve, thereby cutting off communication between the secondary inlet port 13 and the port 14. Final upward movement of the motor piston 38 and the piston 59 carries the shuttle valve 47 upward, lifting the poppet 48 off the seat 57 and thereby communicating the primary inlet port 12 with the outlet port 14. Similar action in the lower half of the valve disconnects the output port 14a from the secondary inlet port 13a and connects it to the other primary inlet port 12a, so that the motor cylinder 20 is placed under the control of the 4-way valve 18, supplied with pressure fluid by the booster pump 16 and the main pump 17.

Where the main pressure fluid supply provides a low pressure and a high pressure, it is desirable to control the valve 10 from the low pressure rather than the high pressure, as is shown in the drawing. However, some problems are encountered in the control of fluid at high pressure by a fluid at low pressure. These problems have been solved in the valve 10 by providing the motor piston 38 of relatively large area compared to the area involved in the shuttle valve 47, and by balancing the shuttle valve with respect to the high pressure to which it is exposed. Thus when the shuttle valve is in inner position as shown, the pressure forces applied to the shuttle valve from the secondary inlet port 13 at the recess 60 are balanced, and the pressure forces applied to the shuttle valve at the ends of the counterbores 58 and 53 are balanced because these two counterbores are of the same diameter. The diameter of the seat 57 is the same as the diameter of the upper portion of the shuttle valve sealing with the insert 44, so that no unbalanced pressures are applied at that point. The upper end of the shuttle valve is exposed to atmospheric pressure, since the closure plug 46 is vented by a vent 70, and the inner end of the shuttle valve is vented to atmosphere through vent 42. All areas of the shuttle valve 48 exposed to high pressure fluid when the shuttle valve is in its outer position are also balanced by similar opposed areas. Of course, when the piston 59 is in its outer position sealing the lower end of the bore 50, an area of the piston equal to the area of the bore 50 is exposed to the high pressure in the ports 12 and 14 and this pressure must be overcome by the motor piston 38. It is for this reason that the motor piston 38 is made of much larger area than the port 50.

The valve is readily adaptable for use in a system in which the full output pressure of the main pump 17 is applied to the control port 11. However, under such conditions the motor cylinder 35 and the motor piston 38 can be made of much smaller diameter.

Although for the purpose of explaining the invention, a particular embodiment thereof has been shown and described, obvious modifications will occur to a person skilled in the art, and I do not desire to be limited to the exact details shown and described.

I claim:

1. A valve of the type described, comprising: a casing defining a motor cylinder and a coaxial valve cylinder extending outwardly from one end of said motor cylinder; a motor piston in said motor cylinder, said motor cylinder having a pressure-venting port on the outer side of said motor piston and having a control pressure port on the inner side of said motor piston, and spring means urging said piston inwardly in opposition to pressure in said control pressure port; said valve cylinder having an annular recess intermediate its ends defining an output chamber, and an output port in said casing communicating with said output chamber, the juncture of said annular recess and the portion of said valve cylinder on the inner side thereof defining a first poppet seat; said casing having a primary inlet port communicating with said valve cylinder on the inner side of said first seat and a secondary inlet port communicating with said valve cylinder at a point inwardly spaced from said primary port; a shuttle valve in said valve cylinder having a poppet portion intermediate its ends for seating against said first poppet seat, said shuttle valve having a longitudinal bore therein; means sealing the outer end of said bore and a counterbore extending into said bore from the inner end thereof, the juncture of said bore and counterbore defining a second poppet seat, a port connecting said bore with said output chamber, and a port connecting said counterbore with said secondary inlet port; a piston valve in said counterbore and projecting inwardly therefrom for actuation by said motor piston, said piston valve having a poppet cooperating with said second poppet valve seat; and spring means urging said shuttle valve inwardly to seat said poppet portion of said shuttle valve against said first seat, said spring means yielding in response to predetermined pressure in said motor cylinder to permit said motor piston to first seat said piston valve against said second seat to break communication between said secondary inlet port and said output port and then unseat said poppet portion of said shuttle valve to communicate said primary inlet port with said outlet port.

2. A valve according to claim 1 having a second section identical with that described, extending from the inner end of the described section, the motor cylinder of each section being continuous with and constituting a closure member for the inner end of the other.

3. A valve according to claim 1 in which said shuttle valve has a second counterbore at the outer end thereof having the same diameter as the said counterbore of the inner end thereof; and said means for sealing the outer end of said bore comprising a piston in said second counterbore and means restraining outward movement of said last mentioned piston with respect to said casing.

JOSEPH B. GUNN.

REFERENCES CITED

The following references are of record in the file of this patent:

UNITED STATES PATENTS

| Number | Name | Date |
|---|---|---|
| 2,206,957 | Hose | July 9, 1940 |
| 2,313,797 | Bailey | Mar. 16, 1943 |
| 2,563,419 | Rockwell | Aug. 7, 1951 |